(12) United States Patent  
Johnson et al.

(10) Patent No.: US 11,437,793 B2  
(45) Date of Patent: Sep. 6, 2022

(54) SPLICE MEMBER FOR A CABLE TRAY

(71) Applicant: Eaton Intelligent Power Limited, Dublin (IE)

(72) Inventors: Jacob Lee Johnson, New Baden, IL (US); Brandon Michael Tally, Greenville, IL (US); Phillip Warren Harmon Pruitt, Carlyle, IL (US); Travis Cole Shelton, Edwardsville, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 16/510,633

(22) Filed: Jul. 12, 2019

(65) Prior Publication Data

US 2020/0021092 A1 Jan. 16, 2020

Related U.S. Application Data

(60) Provisional application No. 62/697,830, filed on Jul. 13, 2018.

(51) Int. Cl.  
*H02G 3/06* (2006.01)  
*F16L 3/26* (2006.01)  
*H02G 3/04* (2006.01)

(52) U.S. Cl.  
CPC .............. *H02G 3/0608* (2013.01); *F16L 3/26* (2013.01); *H02G 3/0456* (2013.01)

(58) Field of Classification Search  
CPC ........... F16L 3/26; H02G 3/0456; H02G 3/06; H02G 3/00; H02G 3/02

USPC ... 248/49, 58, 60, 65, 300, 68.1, 70, 72, 73; 211/126.1, 126.16  
See application file for complete search history.

(56) References Cited

U.S. PATENT DOCUMENTS

| | | | | |
|---|---|---|---|---|
| 2,834,622 A | * | 5/1958 | Reeves | H02G 3/0608 403/335 |
| 2,917,083 A | * | 12/1959 | Duvall | H02G 3/0608 285/284.1 |
| 3,053,358 A | * | 9/1962 | Gross | F16G 13/16 52/696 |
| 3,331,916 A | * | 7/1967 | George | H02G 3/0608 174/68.3 |
| 3,636,984 A | * | 1/1972 | Rauhauser | H02G 3/0418 138/155 |
| 4,040,449 A | * | 8/1977 | Butler | H02G 3/0608 138/92 |
| 4,398,564 A | * | 8/1983 | Young | H02G 3/0418 138/155 |
| 4,997,155 A | * | 3/1991 | Reuter | F16M 11/2014 248/278.1 |

(Continued)

*Primary Examiner* — Eret C McNichols  
*Assistant Examiner* — Michael McDuffie  
(74) *Attorney, Agent, or Firm* — Stinson LLP

(57) ABSTRACT

A cable tray section includes first and second side rails, each side rail having opposite longitudinal ends and a length extending between the opposite longitudinal ends. A splice member is secured to one of the first and second rails adjacent one of the longitudinal ends. The splice member includes at least one opening configured to receive a fastener to connect the splice member to another splice member of another cable tray section to attach the two cable tray sections together. The at least one opening has an axis extending along the length of at least one of the first and second rails.

16 Claims, 14 Drawing Sheets

(56) References Cited

U.S. PATENT DOCUMENTS

| | | | | |
|---|---|---|---|---|
| 4,998,702 A * | 3/1991 | Reuter | F16M 11/08 | 248/278.1 |
| 5,449,208 A * | 9/1995 | Fox | E01B 7/24 | 285/325 |
| 5,465,929 A * | 11/1995 | Dooley | H02G 3/0456 | 248/68.1 |
| 5,564,658 A * | 10/1996 | Rinderer | F16L 3/22 | 248/49 |
| 5,628,580 A * | 5/1997 | Rinderer | H02G 3/0456 | 403/22 |
| 5,782,439 A * | 7/1998 | Rinderer | H02G 3/0456 | 174/72 R |
| 5,792,993 A * | 8/1998 | Rinderer | H02G 3/0608 | 138/92 |
| 5,816,542 A * | 10/1998 | Rinderer | F16L 3/22 | 248/58 |
| 6,313,405 B1 * | 11/2001 | Rinderer | H02G 3/0456 | 174/68.3 |
| 6,340,141 B1 * | 1/2002 | Rinderer | H02G 3/0456 | 211/26 |
| 6,354,542 B1 * | 3/2002 | Meyer | F16L 3/243 | 248/58 |
| 6,547,192 B2 * | 4/2003 | Rinderer | H02G 3/0608 | 248/49 |
| 6,603,073 B2 * | 8/2003 | Ferris | H02G 3/0608 | 174/481 |
| 6,783,104 B1 * | 8/2004 | Roth | F16B 7/0433 | 248/226.11 |
| 7,762,042 B2 * | 7/2010 | Packard, III | H02G 3/0608 | 52/848 |
| 8,178,781 B2 * | 5/2012 | Duffy | H02G 3/0412 | 174/70 C |
| 8,424,814 B2 * | 4/2013 | Davis | F16B 2/245 | 248/49 |
| 8,459,604 B2 | 6/2013 | Smith et al. | | |
| 8,733,723 B2 | 5/2014 | Smith et al. | | |
| 8,757,559 B2 * | 6/2014 | Davis | F16B 2/245 | 248/49 |
| 9,209,609 B2 * | 12/2015 | Kellerman | E04B 1/5812 | |
| 9,625,669 B2 * | 4/2017 | Tally | G02B 6/4459 | |
| 9,841,123 B1 * | 12/2017 | White | F16B 7/182 | |
| 10,367,340 B2 * | 7/2019 | Bae | H02G 3/0412 | |
| 10,693,285 B2 * | 6/2020 | Jaeker | H02G 3/0437 | |
| 2004/0049998 A1 * | 3/2004 | Jette | E04F 15/02458 | 52/220.1 |
| 2015/0008295 A1 | 1/2015 | Bae et al. | | |

* cited by examiner

US 11,437,793 B2

SPLICE MEMBER FOR A CABLE TRAY

CROSS-REFERENCE TO RELATED APPLICATIONS

This application claims the benefit of U.S. Provisional Application No. 62/697,830, filed Jul. 13, 2018, the entire contents of which are hereby incorporated by reference.

FIELD OF THE DISCLOSURE

The present disclosure generally relates to a splice connection for a cable tray, and more particularly to a splice member for a cable tray, a method of using the same, and a cable tray assembly including the splice member.

BACKGROUND OF THE DISCLOSURE

Ladder-type cable tray is used by industry to support electrical cable, for example. A length or section of ladder cable tray comprises a pair of side rails connected by cable-supporting rungs extending between the rails at intervals along the tray. Typically, cable tray sections are spliced together using splice plates to form a cable tray assembly.

SUMMARY OF THE DISCLOSURE

In one aspect, a splice member for a splicing together cable tray sections comprises a body configured to be attached to a rail of the cable tray section. The body defines at least one opening configured to receive a fastener to connect the splice member to another splice member. The at least one opening having an axis extending along the rail when the body is attached to the rail.

In another aspect, a cable tray section comprises first and second side rails. Each side rail having opposite longitudinal ends and a length extending between the opposite longitudinal ends. A splice member is secured to one of the first and second rails adjacent one of the longitudinal ends. The splice member includes at least one opening configured to receive a fastener to connect the splice member to a second splice member of a second cable tray section in order to join the cable tray section with said second cable tray section. The at least one opening has an axis extending along the length of said at least one of the first and second rails.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DISCLOSURE

Figure 1:
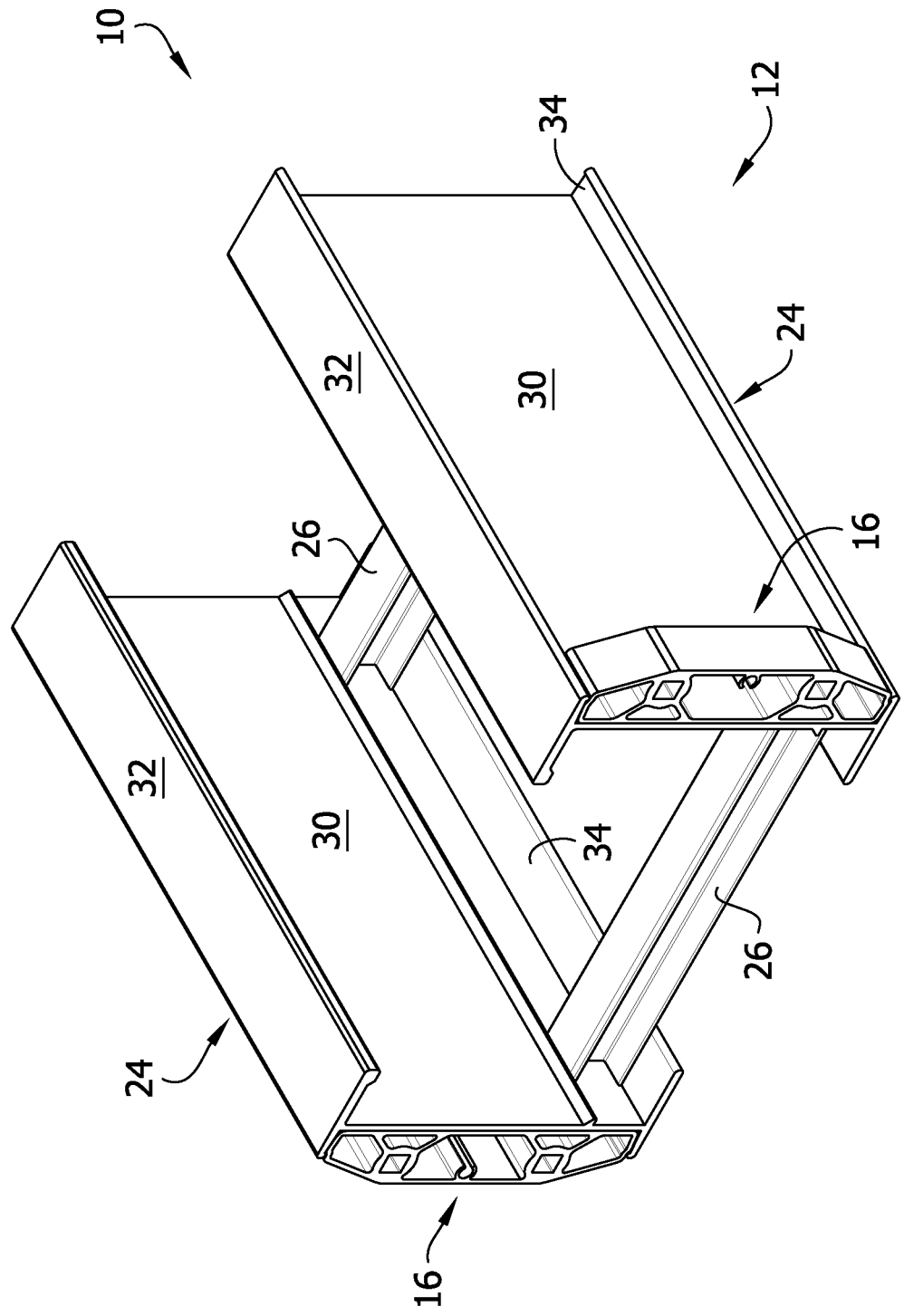
FIG. 1 is a perspective of a cable tray assembly including a cable tray section and splice members according to one embodiment of the present disclosure.
Figure 2:
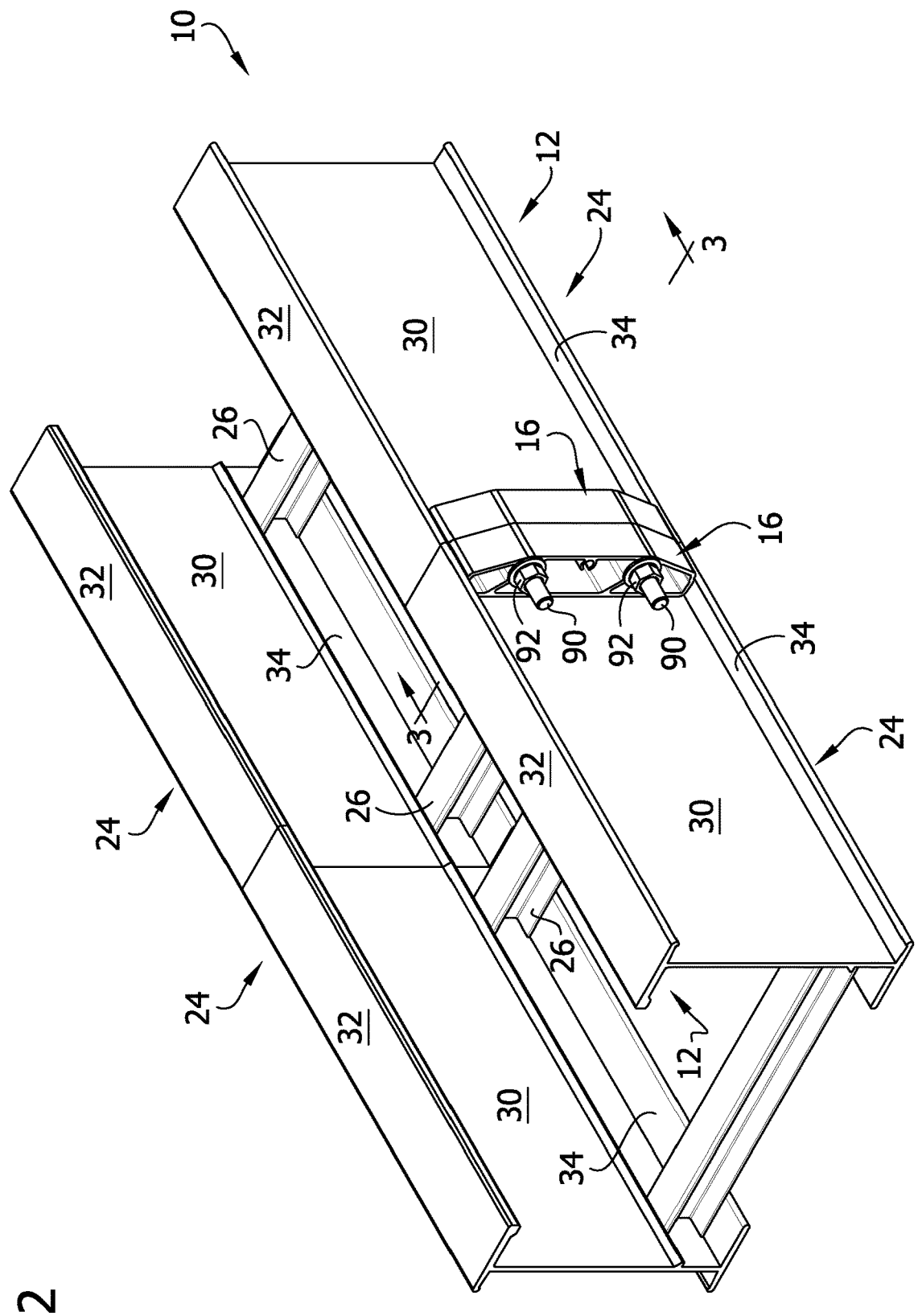
FIG. 2 is a perspective of a juncture of two cable tray sections joined together with splice members.
Figure 3:
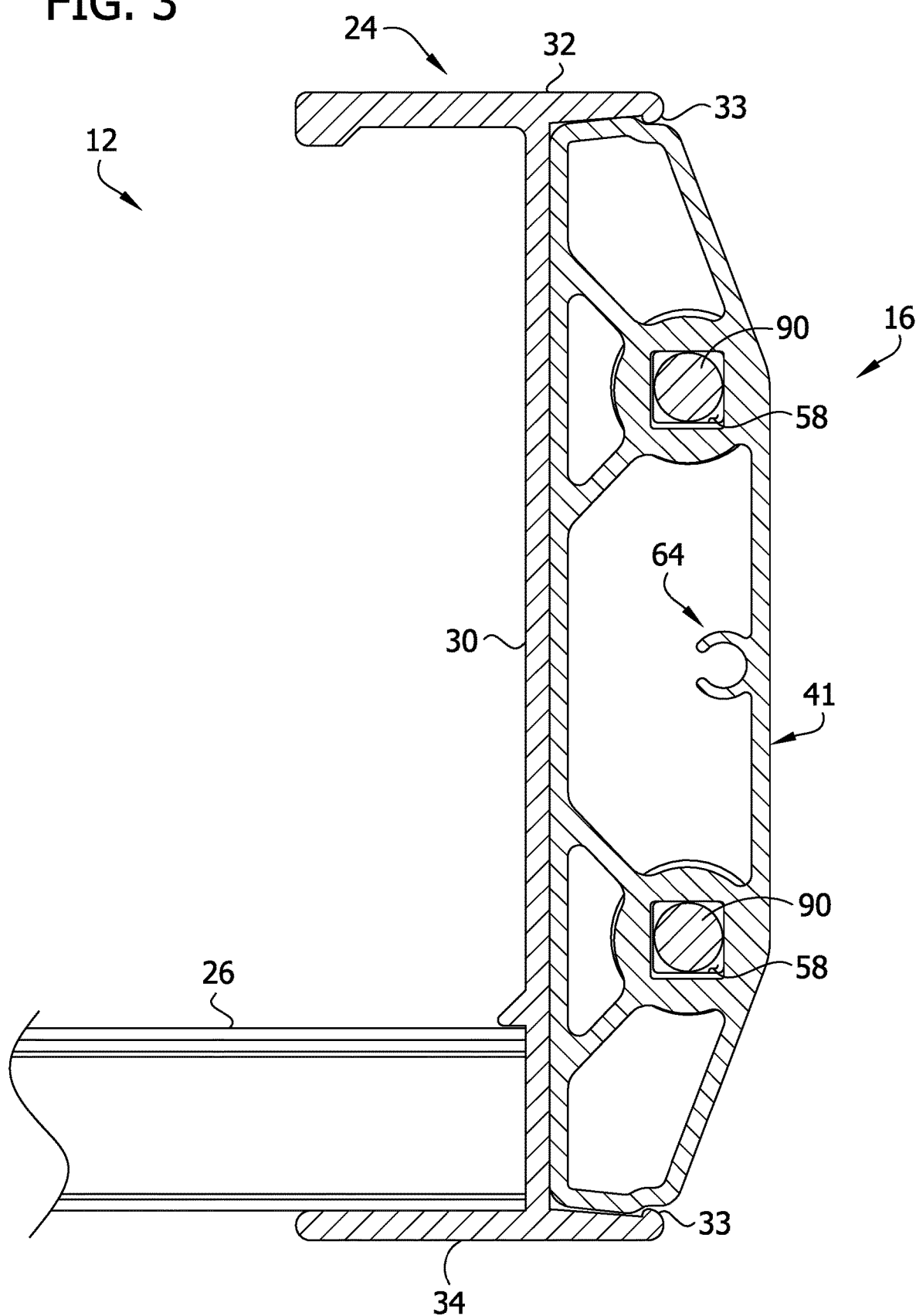
FIG. 3 is a cross-sectional view of the splice member attached to the cable tray section taken through line 3-3 of FIG. 2
Figure 4:
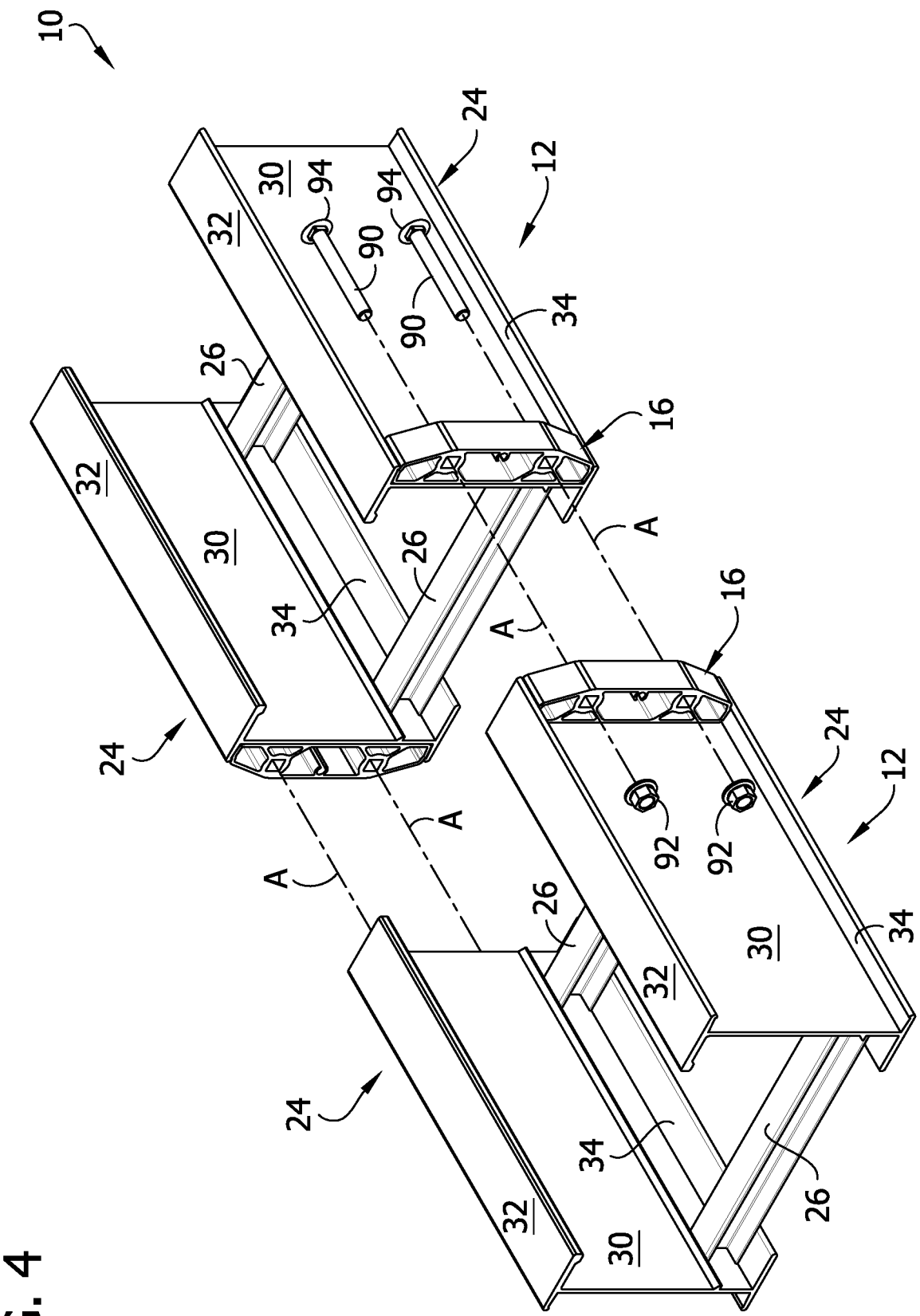
FIG. 4 is an exploded perspective of FIG. 2.
Figure 5:
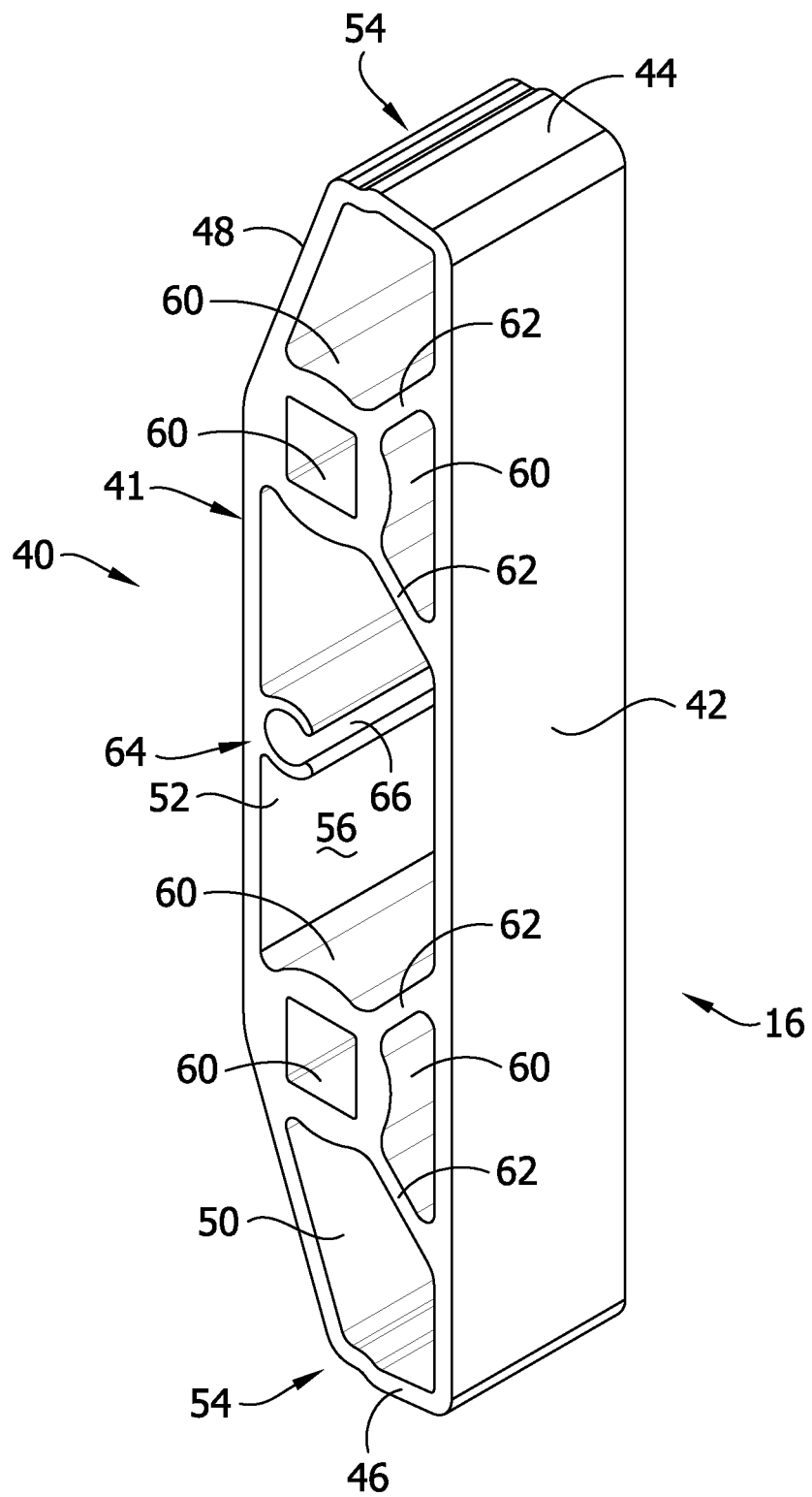
FIG. 5 is a perspective of the splice member of FIG. 1.

Referring now to the drawings, and in particular to FIGS. 1-4, a cable tray assembly constructed according to the teachings of the present disclosure is generally indicated at reference numeral 10. The cable tray assembly 10 includes at least one cable tray section, generally indicated at 12, and at least one splice member, generally indicated at 16, connected to each cable tray section. As shown in FIGS. 2 and 4, the splice members 16 are used to connect (e.g., splice) the ends of adjacent cable tray sections 12 together. As used herein, terms denoting relative locations and positions of components and structures, including but not limited to "upper," "lower," "left," "right," "front," and "rear," are in reference to the cable tray assembly 10 in the horizontal orientation, as shown in FIG. 1 and the splice member 16 shown in the vertical orientation, as shown in FIG. 5. It is understood that these terms are used for ease of description and not meant in a limiting sense. It is understood that the cable tray assembly 10 may be in a vertical orientation in the field, whereby the relative locations and positions of the components and structures would be different than as shown in the drawings. As used herein, the term "inboard" means toward or in the interior of the cable tray section 12 and/or cable tray assembly 10. As used herein, the term "outboard" means away from the interior or at the exterior of the cable tray section 12 and/or cable tray assembly 10.

Referring to FIGS. 1-4, the illustrated cable tray section 12 includes two side rails, generally indicated at 24, (e.g., straight parallel rails) forming the sides of the cable tray section, and a plurality of cable-supporting rungs 26 extending between the rails 24 at intervals spaced lengthwise of the section. It is understood that in one or more embodiments, the rails 24 may curved rather than straight or may have other shapes. Each rail 24 has a generally I-shaped cross section or profile, broadly a first cross-sectional shape (e.g., an I-shaped beam). Each rail 24 may have other cross-sectional shapes. Each illustrated rail 24 comprises a generally vertical web 30, an upper generally horizontal flange 32 at the upper end of the web having inboard and outboard portions relative to the vertical web, and a lower generally horizontal flange 34 at the lower end of the web having inboard and outboard portions relative to the vertical web. The rungs 26 are secured or fixed (e.g., by welding or with fasteners) to the inboard portions of the lower flanges 34. Each rail 24 has opposite longitudinal ends and a length extending therebetween, which generally corresponds to the length of the cable tray section 12. The length of each manufactured cable tray section 12 may also vary (e.g., from 10-30 feet). The cable tray sections 12 are often cut to fit in the field to varying lengths.

The splice member 16 is connected to the cable tray section 12, preferably at a longitudinal end thereof (e.g., the splice member is configured to be connected to the cable tray section). In the illustrated embodiment, the splice member 16 is coupled to the outboard side of one of the side rails 24, specifically the space or channel defined by the vertical web 30 and the outboard portions of the upper and lower horizontal flanges 32, 34. The splice member 16 is generally perpendicular to the cable loading plane of the cable tray section (e.g., the top surface of the rungs 26 that support the cables). In other embodiments, the splice member 16 may be attached to cable tray section 12 in other arrangements or orientations than described herein. The illustrated splice member 16 is connected to one of the longitudinal ends of the rail 24 of the cable tray section 12. As shown in FIGS. 2 and 4, each splice member 16 defines fastener openings 58 that are alignable with fastener openings of another splice member of a second cable tray section 12 and that receive fasteners 90 there-through to join adjacent cable tray assemblies 10 together, as described in more detail below. In one or more embodiments, each cable tray section 12 may include four (4) splice members: one splice member at each longitudinal end of the two rails 24.

Referring to FIGS. 4 and 5, the splice member 16 includes a body, generally indicated at 40, configured to be attached to one of the rails 24 of the cable tray section 12. The body has a perimeter wall 41. The perimeter wall 41 comprises a generally vertical first wall section 42, upper and lower generally horizontal second and third wall sections 44 and 46, respectively, extending from opposite ends of the first wall section 42, a fourth wall section 48 extending generally downward at an angle to the vertical from the second wall, a fifth wall section 50 extending generally upward at an angle to the vertical from the third wall section 46, and a sixth wall section 52 extending generally vertically between and interconnecting the fourth and fifth wall sections. The first and sixth wall sections 42, 52 are spaced apart and generally parallel to one another. In one or more embodiments, the perimeter wall 41 may have other shapes and/or more or less wall sections.

The perimeter wall 41 (broadly, at least a portion of the perimeter wall) is sized and shaped to correspond to the cross-sectional shape of the rail 24 of the cable tray section 12. The first, second, and third wall sections 42, 44, 46 of the perimeter wall 41 are configured to correspond generally to the size and shape of the rail 24, specifically, the outboard portion of the rail. The first wall section 42 is configured to engage the vertical web 30 of the rail 24 and, in one or more embodiment, lays flat against the vertical web when the splice member 16 is attached to the cable tray section 12 (FIG. 3). The second and third wall sections 44, 46 are configured to engage the upper and lower horizontal flanges 32, 34, respectively. In this manner, the splice member 16 (specifically, the perimeter wall 41) is in a close fitting relationship with the rail 24 when the splice member is attached to the rail. In the illustrated embodiment, the second and third wall sections 44, 46 each include a notch or recess 54 adjacent the angled fourth or fifth wall section 48, 50 configured to receive a lip 33 (FIG. 4) or other projection from the upper and lower horizontal flanges 32, 34 to facilitate the coupling of the splice member 16 to the rail 24 of the cable tray 12, as described in more detail below. In other embodiments, the perimeter wall 41 may have other shapes and sizes to conform to rails 24 of other shapes and sizes.

Figure 6:
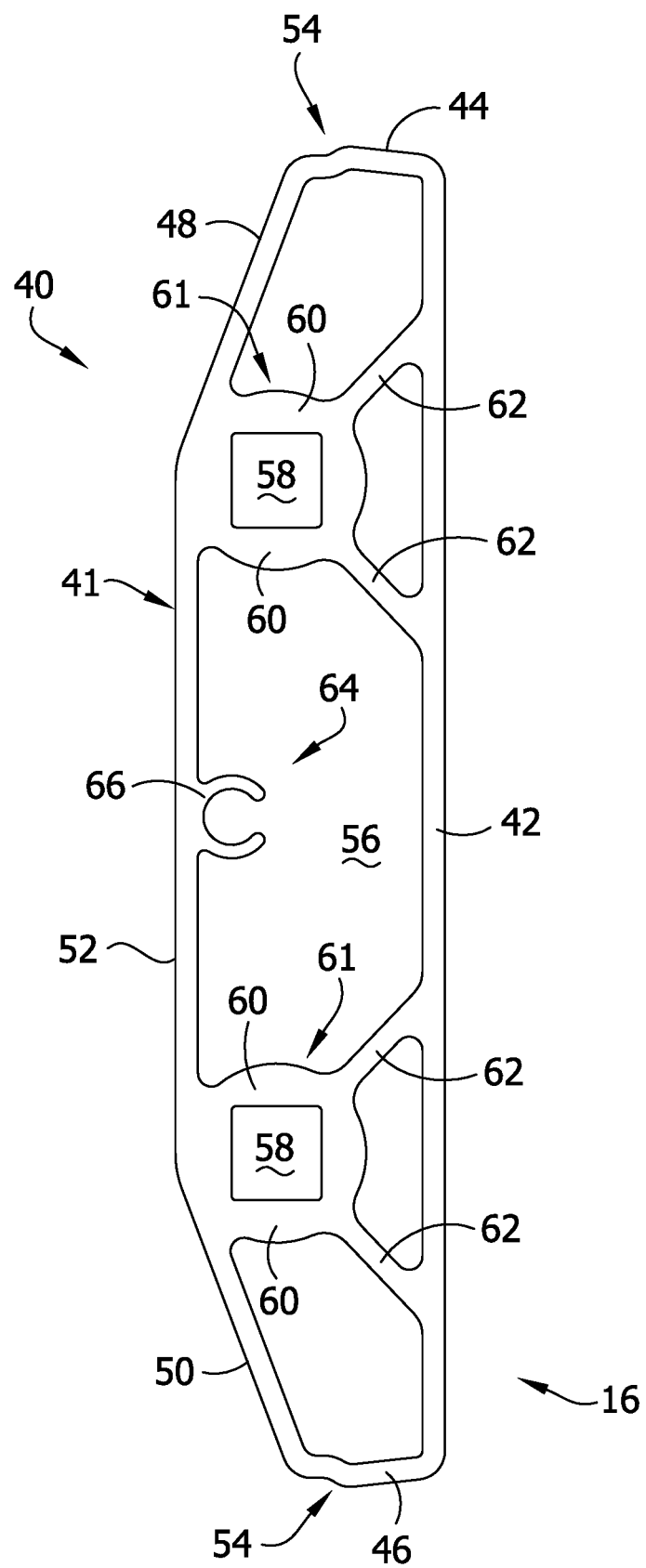
FIG. 6 is a front view thereof.

As show in FIGS. 5 and 6, the perimeter wall 41 encloses an interior space 56 of the body 40, the interior space having an open front and back defined by the perimeter wall. The body 40 of the splice member 16 includes one or more fastener openings 58. In the illustrated embodiment, the fastener openings 58 are defined, at least partially, by one or more interior or interior walls 60 in the interior space 56. In the illustrated embodiment, the splice member 16 includes two fastener openings 58 that are vertically spaced apart. In other embodiments, the splice member 16 may include more or less fastener openings 58. Each opening 58 has (e.g., defines) an axis A (FIG. 4). The axis A of each opening 58 extends along to the rail 24 when the splice member 16 is attached to the rail. When secured to the rail 24, the axis A of each opening 58 is generally parallel to the rail 24 and the cable loading plane. The fastener openings 58 are positioned in the interior space 56 and are configured to receive a fastener 90 to attach adjacent splice members 16 and, thereby, cable tray sections 12 together, as described in more detail below. In the illustrated embodiment, the fastener openings 58 have a rectangular or square-shaped cross section. In other embodiments, the fastener openings 58 may have other cross-sectional shapes. In addition to the interior walls 60, the fastener openings 58 may be defined by other parts of the body 40 as well. For example, in the illustrated embodiment, a portion of one fastener opening 58 is defined by the connection between fourth and sixth wall sections 48, 52 and a portion of another fastener opening is defined by the connection between the fifth and sixth wall sections 50, 52. For reasons that will become apparent, the fastener openings 58 are spaced apart from and disposed interiorly of the perimeter wall 41. In particular, the fastener openings 58 are spaced apart from the first wall section 42. The interior walls 60 may be directly connected to the perimeter wall 41 and/or the body 40 may include one or more stiffening ribs 62 extending between and interconnecting the interior walls and the perimeter wall. For example, in the illustrated embodiment, the some interior walls 60 are directly connected to the perimeter wall 41 and/or some interior walls are connected to the first wall section 42 of the perimeter wall 41 with ribs 62.

In the illustrated embodiment, the interior walls 60 have a varying thickness with a convex (e.g., curved or circular) exterior surface (relative to the opening 58). As a result, the interior walls 60 (specifically, the front or rear edge margins of the interior walls) generally form a generally circular seat 61 on the front and rear sides of the splice member 16 with the opening 58 at the center (FIG. 6). Each seat 61 is sized and shaped to correspond to the size and shape of the head 94 of the fastener 90 and the nut 92. The seat 61 is engaged by either the head 94 of the fastener 90 or the nut 92 when the fastener and nut are used to secure adjacent cable tray sections 12 together via the splice members 16. As a result of the circular seat 61, the forces applied by the head 94 of the fastener 90 and nut 92 are spread out over a greater surface area and the seat generally covers the edges of the head 94 of the fastener and the nut 92.

The perimeter wall 41, interior walls 60 and ribs 62 generally all extend from the front (e.g., front side) of the splice member 16 to the rear (e.g., rear side) of the splice member. The front edge margins of the perimeter wall 41, interior walls 60 and ribs 62 define the front of the spice member. In particular, they define a front plane of the splice member. As shown in FIG. 1, when the splice member 16 (e.g., the right splice member) is attached to the right rail 24, the front plane of the splice member is generally aligned with the longitudinal end of the rail. Similarly, the rear edge margins of the perimeter wall 41, interior walls 60 and ribs 62 define the rear of the spice member. In particular, they define a rear plane of the splice member. As shown in FIG. 1, when the splice member 16 (e.g., the left splice member) is attached to the left rail 24, the rear plane of the splice member is generally aligned with the longitudinal end of the rail. It is appreciated that the left splice member 16 of FIG. 1 is rotate approximately 180 degrees (e.g., flipped over, turned around) about a vertical axis relative to the right splice member of FIG. 1 in order to attach to the exterior of the left rail 24. As shown in FIGS. 1-6, each opening 58 has an open front and rear end on the front and rear sides, respectively, of the splice member 16 to allow the fastener 90 to extend through the opening.

The body 40 of the splice member 16 may also include an accessory attachment portion 64 configured to connect to a cable tray accessory (not shown). In the illustrated embodiment, the accessory attachment portion 64 includes a partially circumferential wall 66 that defines a C-shaped accessory opening configured to receive or connect to a cable tray accessory. The partially circumferential wall 66 has two free ends that define a slot in communication with the C-shaped accessory opening. In one embodiment, the accessory attachment portion 64 connects a bonding jumper (not shown) to the splice member 16. A cable or line (not shown) of the bonding jumper can be inserted into the C-shaped accessory opening through the slot. Moreover, the perimeter wall 41 and interior space 56 provides numerous locations for other accessories to be attached to the splice member 16. For example, the splice member 16 may provide an attachment location for various accessories used with a cable tray assembly 10 such as a lifting accessory used during installation, hold-down clamps, suspension hangers, seismic bracing, expansion rails, etc. It is also understood, the splice member 16 may further stiffen and strengthen the section of the rail 24 the splice member is attached to in order to better withstand the forces applied by these various accessories used with the cable tray assembly 10.

The body 40 of the splice member 16 may be integrally formed as a single, one-piece component. In one embodiment, the splice member 16 is formed from extruded aluminum, although the splice member may be formed from other metals or alloys or other materials (e.g., plastic) and/or formed by other methods with departing from the scope of the present disclosure. In one embodiment, the splice member 16 is integrally formed with the cable tray section 12 (e.g., rail 24) to form a single, one-piece component. In another embodiment, the splice member 16 is a separate component from the cable tray section 12 and is mechanically and/or chemically joined to the cable tray section— either in the field or at a manufacturing facility. For example, as mentioned above, the perimeter wall 41 of the splice member 16 includes recesses 54 that receive portions (e.g., the lip 33) of the rail 24 to couple the splice member to the cable tray section 12 (FIG. 4). In this manner, the splice member 16 is configured to clip onto the rail 24 (e.g., configured to form a snap-fit connection with the rail). Specifically, in this embodiment, the perimeter wall 41 deflects the ends of the flanges 32 away from one another as the splice member 16 is moved into engagement with the web 30. When the recesses 54 and lips 33 align with one another, the flanges 32 return to their original shape, moving each lip into a corresponding recess. The shape of the recess 54 forms a detent or catch, which is part of the perimeter wall 41 and inhibits the splice member 16 from disconnecting from the rail 24. In another embodiment, the perimeter wall 41 may include adhesive to bond the splice member 16 to the vertical web 30 of the rail 24. For example, the adhesive may be disposed on the portions of the perimeter wall 41 (e.g., the first, second, and third wall sections 42, 44, 46) that engage the rail 24 to bond the splice member 16 to the rail. In another embodiment, the perimeter wall 41 may define fastener openings (not shown) that are alignable with corresponding fastener openings (not shown) in the rail 24 and through which fasteners (not shown) are received to connect the splice member 16 to the cable tray section 12. Other manners of attaching the splice member 16 to the cable tray section 12 are within the scope of the present disclosure.

Referring to FIGS. 2 and 3, in one method of assembling the cable tray assembly 10, after the splice members 16 are attached to the cable tray section 12, as described above, the longitudinal ends of adjacent cable tray sections 12 are brought together so that the webs 30 and flanges 32, 24 of the corresponding rails 24 are generally abutted. In one embodiment, corresponding splice members 16 on the adjacent cable tray sections 12 may also abut another. The cable tray sections 12 are positioned relative to one another so that the fastener openings 58 of corresponding splice members 16 on each cable tray section are aligned. The adjacent cable tray sections 12 are secured together by inserting fasteners 90 (generally, parallel to the rail 24) through the aligned fastener openings 58 of the splice members 16 and then tightening nuts 92 on the fasteners. The fasteners 90 are preferably carriage bolts whose heads 94 (e.g., square heads) mate with the square shaped fastener opening 58 of the splice member 16 to inhibit the bolt from spinning as the nut 92 is tightened. In other embodiments, the nut 92 may mate with the square-shaped fastener opening 58. In addition, because the fasteners 90 are inserted and extend parallel to the rail, it easier to secure the connection between the adjacent cable tray sections 12. A construction worker can access (with a tool) both the nut and head of the fastener 90 on the outside of the cable tray section 12 to tighten the nut on the fastener, instead of having to reach inside the cable tray to access either the nut or head of the fastener, as with conventional splice plates.

The shape of the splice member 16 is such that the splice member covers the bolt 90 and/or nut 92 to prevent or cover sharp edges—for example, by mating with the bolt or nut. In addition, the portions of the splice member 16 defining the openings 58 (e.g., interior walls 60, fourth wall section 48, and sixth wall section 52) may have a thickness such that the nut or head of the fastener does not overhang (e.g., extend over and past) said portion of the splice member when attached thereto, to cover sharp edges. The spacing between the fastener opening 58 and the rail 24 (e.g., first walls section 42) provides clearance between the nut 92 and rail to allow a tool, such as a wrench, to engage and tighten the nut. Inserting the fasteners 90 through the splice members 16 and tightening the nuts 94 self-aligns the adjacent cable tray sections 12 (e.g., the cable loading plane and rails 24 of cable tray section are aligned at the junction between the cable tray sections). In some embodiments, the fasteners 90 and/or nuts 92 may be pre-installed on the splice members 16. It is understood by one of ordinary skill in the art that the manner of forming cable tray assemblies 10 described herein provides the minimum surface area continuity required by the National Electrical Code (NEC).

Figure 7:
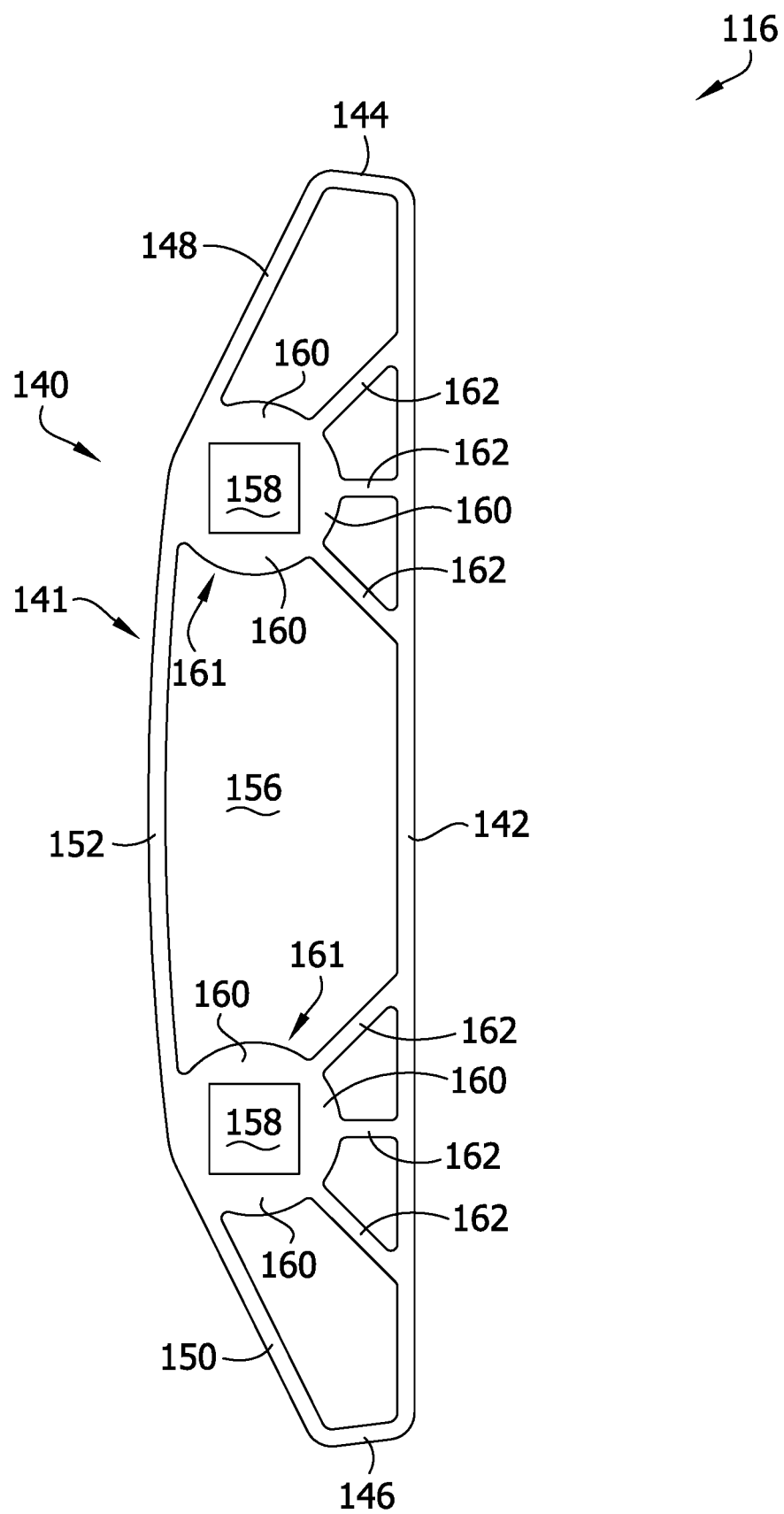
FIG. 7 is a front view of another embodiment of a splice member of the present disclosure.

Referring to FIG. 7, another embodiment of a splice member for splicing together adjacent cable tray sections 12 is generally indicated at reference numeral 116. Splice member 116 is similar to splice member 16 and, thus, fore ease of comprehension, where similar or analogous parts are used, reference numerals "100" units higher are employed. Splice member 116 is generally the same as splice member 16 except that splice member 116 has a different configuration of the perimeter wall 141. In particular, the perimeter wall 141 does not includes recesses. Instead, the second and third wall sections 144, 146 have shorter lengths that general correspond to the distance between the lip 33 and the web 30. In order to form the snap-fit connection with the rail 24, the corner between the second wall section 144 and the fourth wall section 48 forms (e.g., defines) a detent or catch that engages the lip 33 of the upper flange 32 of the rail 24 and the corner between the third wall section 146 and fifth wall section 150 forms a detent or catch that engages the lip 33 of the lower flange 34 of the rail. In addition, splice member 116 does not include an accessory attachment portion. Otherwise, splice member 116 is generally the same as splice member 16 and operates in a same/similar way.

Figure 8:
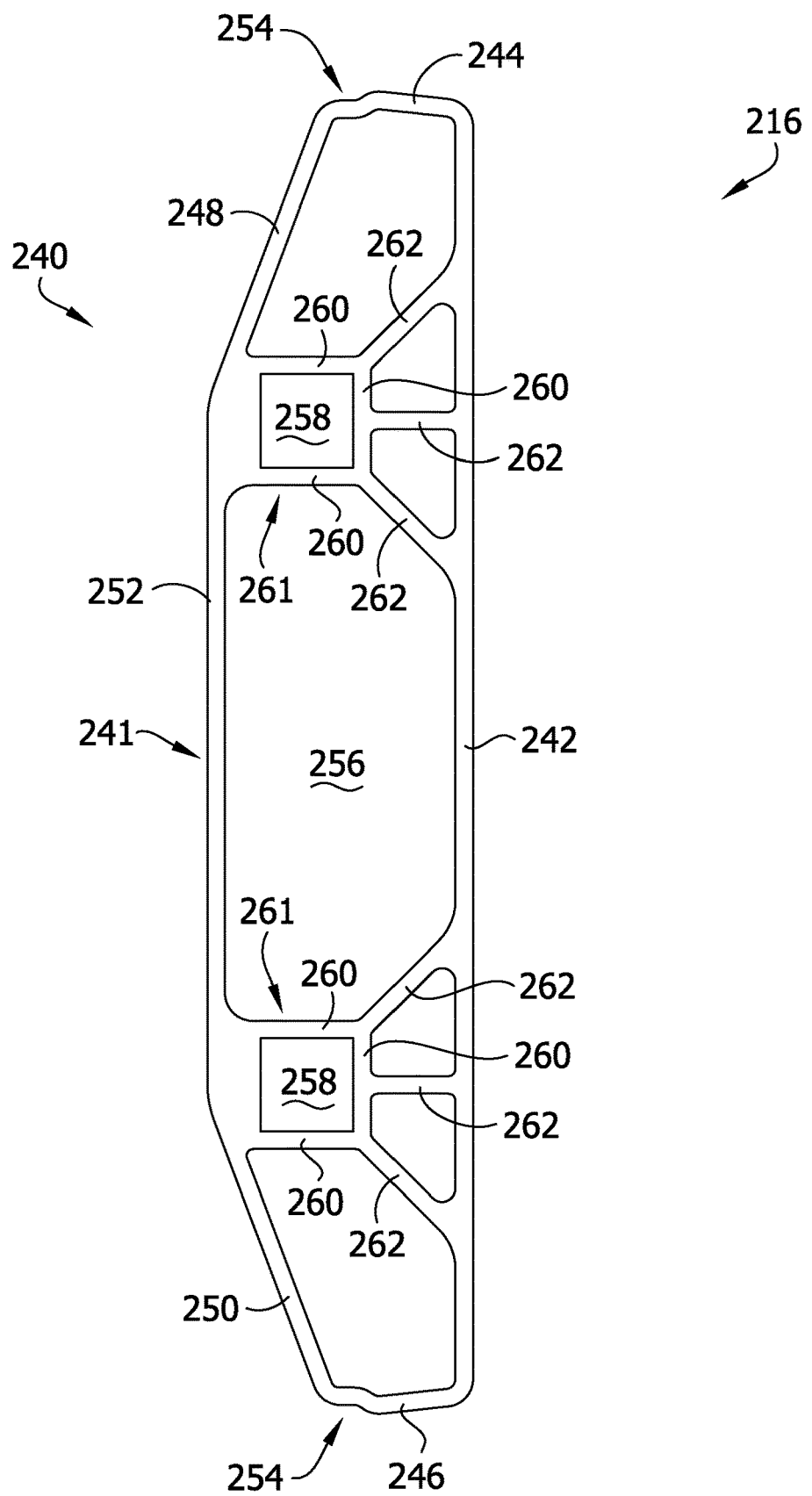
FIG. 8 is a front view of another embodiment of a splice member of the present disclosure.

Referring to FIG. 8, another embodiment of a splice member for splicing together adjacent cable tray sections 12 is generally indicated at reference numeral 216. Splice member 216 is similar to splice member 16 and, thus, fore ease of comprehension, where similar or analogous parts are used, reference numerals "200" units higher are employed. Splice member 216 is generally the same as splice member 16 except that the interior walls 260 are thinner than interior walls 60 and do not have a curved surface. Accordingly, the seat 261 defined by the interior walls 260 is smaller than the seat of splice member 16. Moreover, the seats 261 of splice member 216 do not cover the head 94 of the fastener 90 and the nut. In this embodiment, the seats 261 have a generally rectangular or square shape. In addition, splice member 216 does not include an accessory attachment portion. Otherwise, splice member 216 is generally the same as splice member 16 and operates in a same/similar way.

Figure 9:
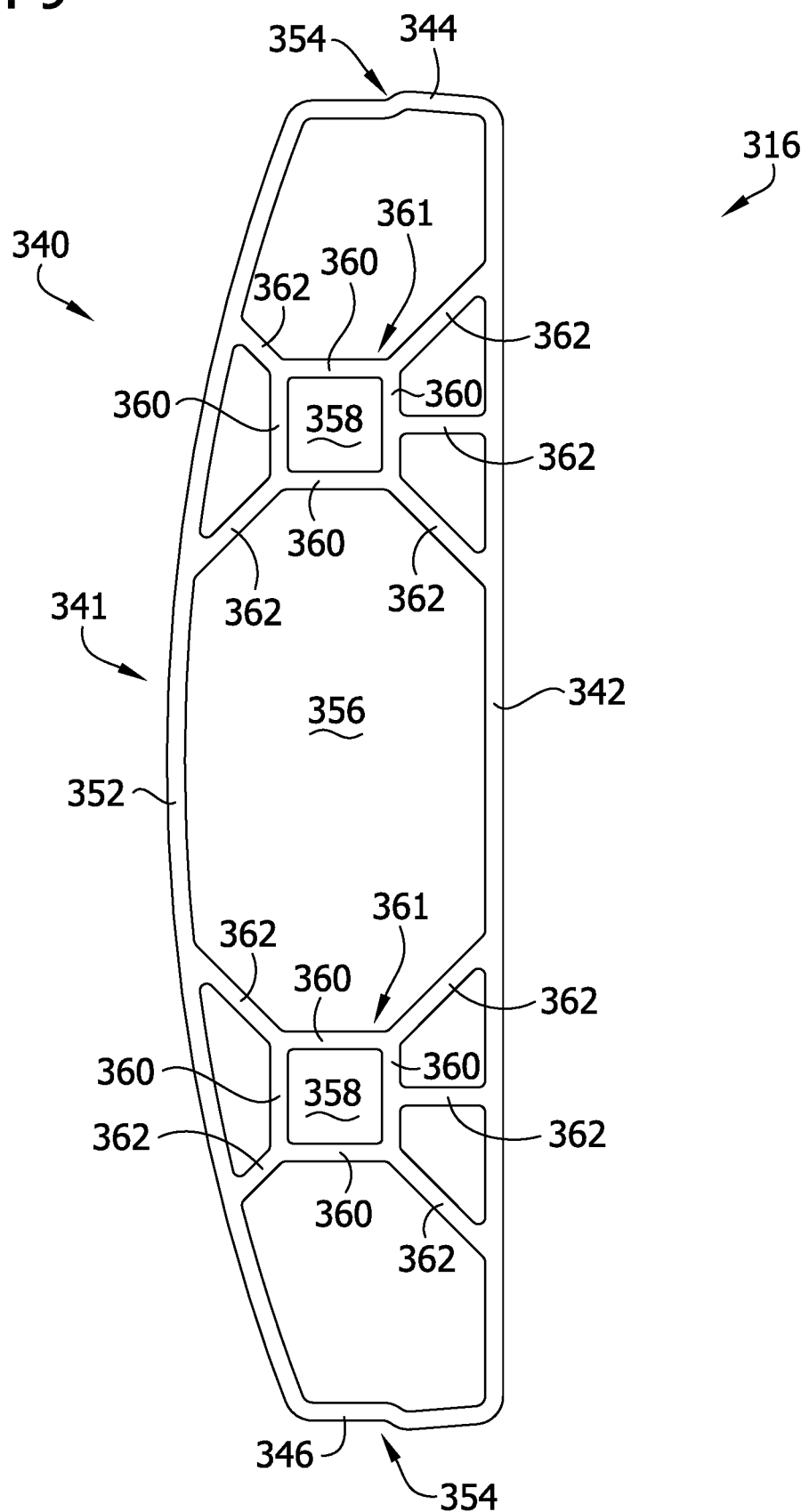
FIG. 9 is a front view of another embodiment of a splice member of the present disclosure.

Referring to FIG. 9, another embodiment of a splice member for splicing together adjacent cable tray sections 12 is generally indicated at reference numeral 316. Splice member 316 is similar to splice member 216 and, thus, fore ease of comprehension, where similar or analogous parts are used, reference numerals "100" units higher are employed. Splice member 316 is generally the same as splice member 216 except that splice member 316 is wider and each opening 358 is disposed more towards the center of the interior space 356. As a result, an additional interior wall 360 is used to define each opening 358. In addition, additional ribs 360 extend from the sixth wall section 352 to the additional interior wall 360 to support the interior walls. In this embodiment, the fourth, fifth and sixth wall section are combined to form a single, generally arcuate wall section 352. In addition, splice member 316 does not include an accessory attachment portion. Otherwise, splice member 316 is generally the same as splice member 216 and operates in a same/similar way.

Figure 10:
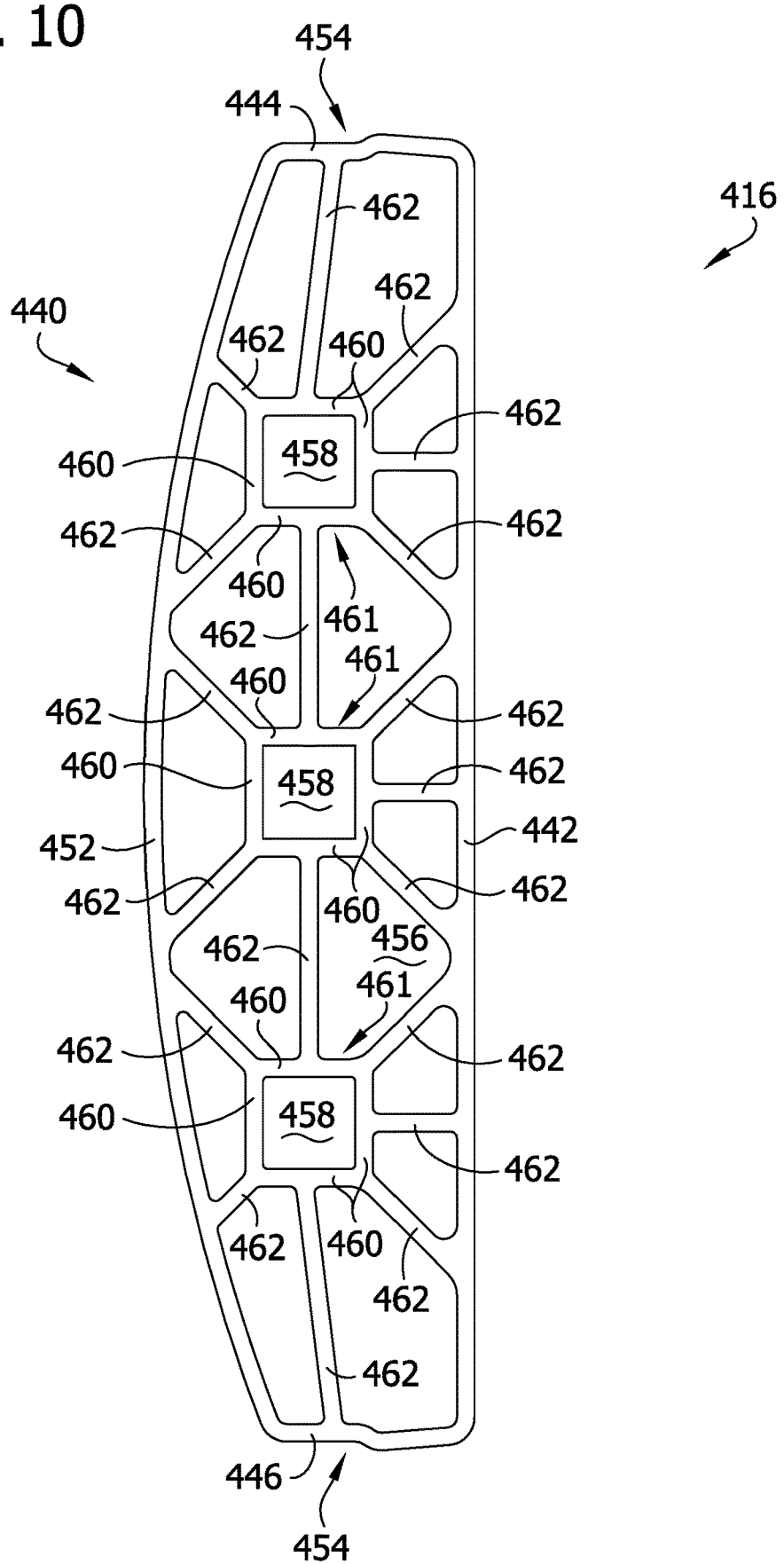
FIG. 10 is a front view of another embodiment of a splice member of the present disclosure.

Referring to FIG. 10, another embodiment of a splice member for splicing together adjacent cable tray sections 12 is generally indicated at reference numeral 416. Splice member 416 is similar to splice member 316 and, thus, fore ease of comprehension, where similar or analogous parts are used, reference numerals "100" units higher are employed. Splice member 416 is generally the same as splice member 316 except that splice member 416 includes a third fastener opening 458. As a result, splice member 416 includes additional interior walls 460 to define the opening 458 and additional ribs 462 to support the interior walls 460. In addition, splice member 416 does not include an accessory attachment portion. Otherwise, splice member 416 is generally the same as splice member 316 and operates in a same/similar way.

Figure 11:
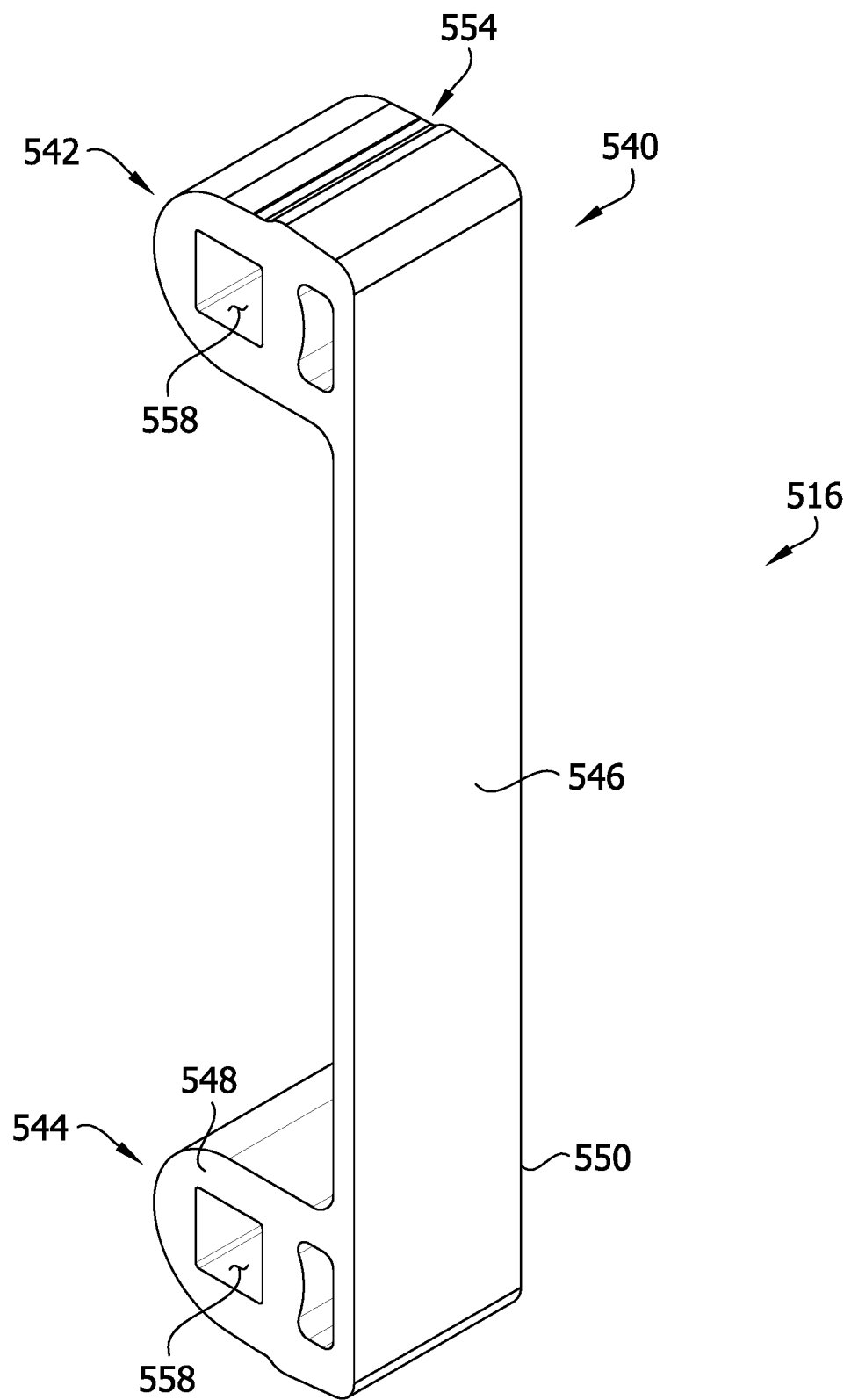
FIG. 11 is a perspective of another embodiment of the splice member of the present disclosure.
Figure 12:
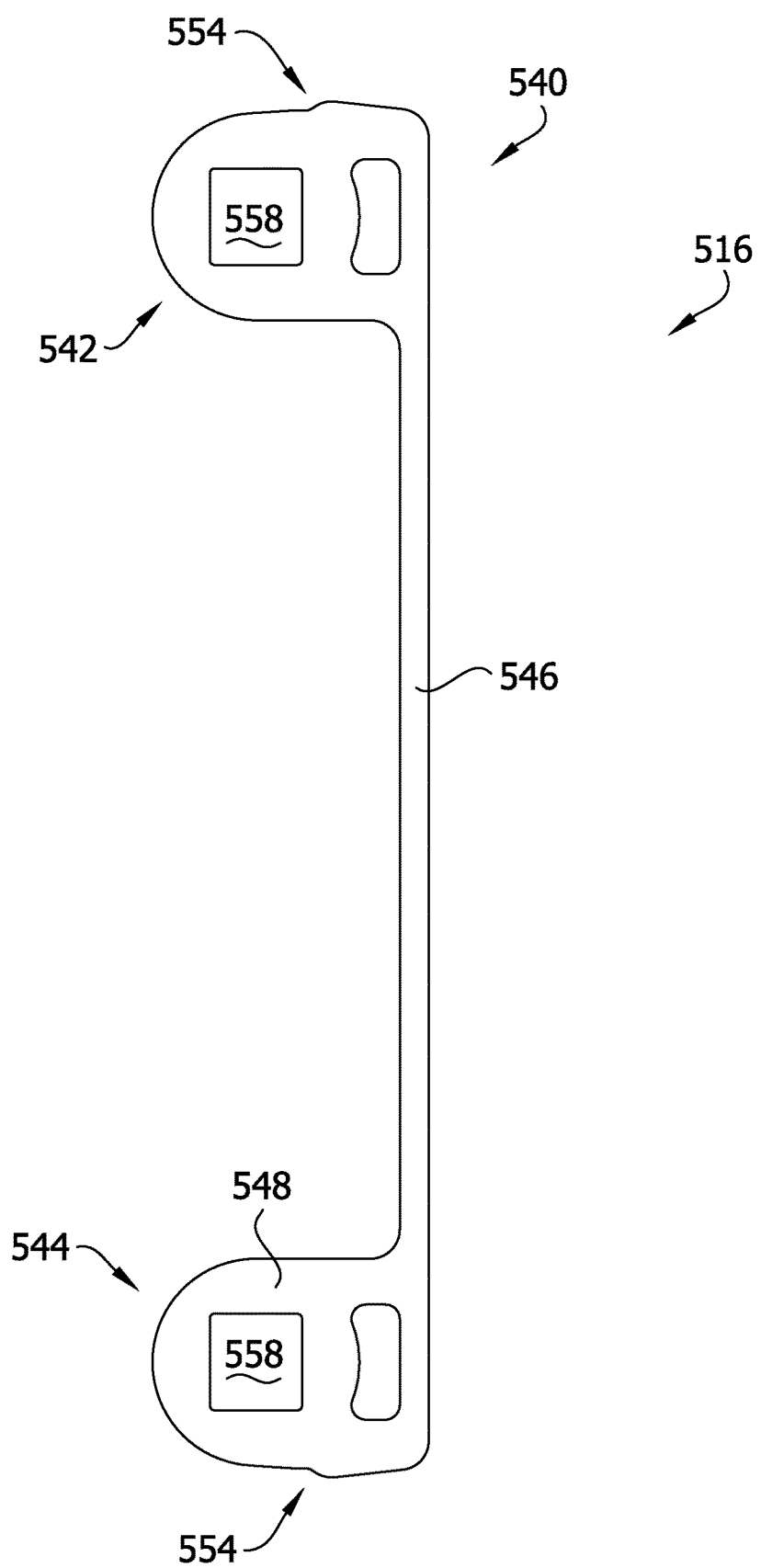
FIG. 12 is a front view thereof.
Figure 13:
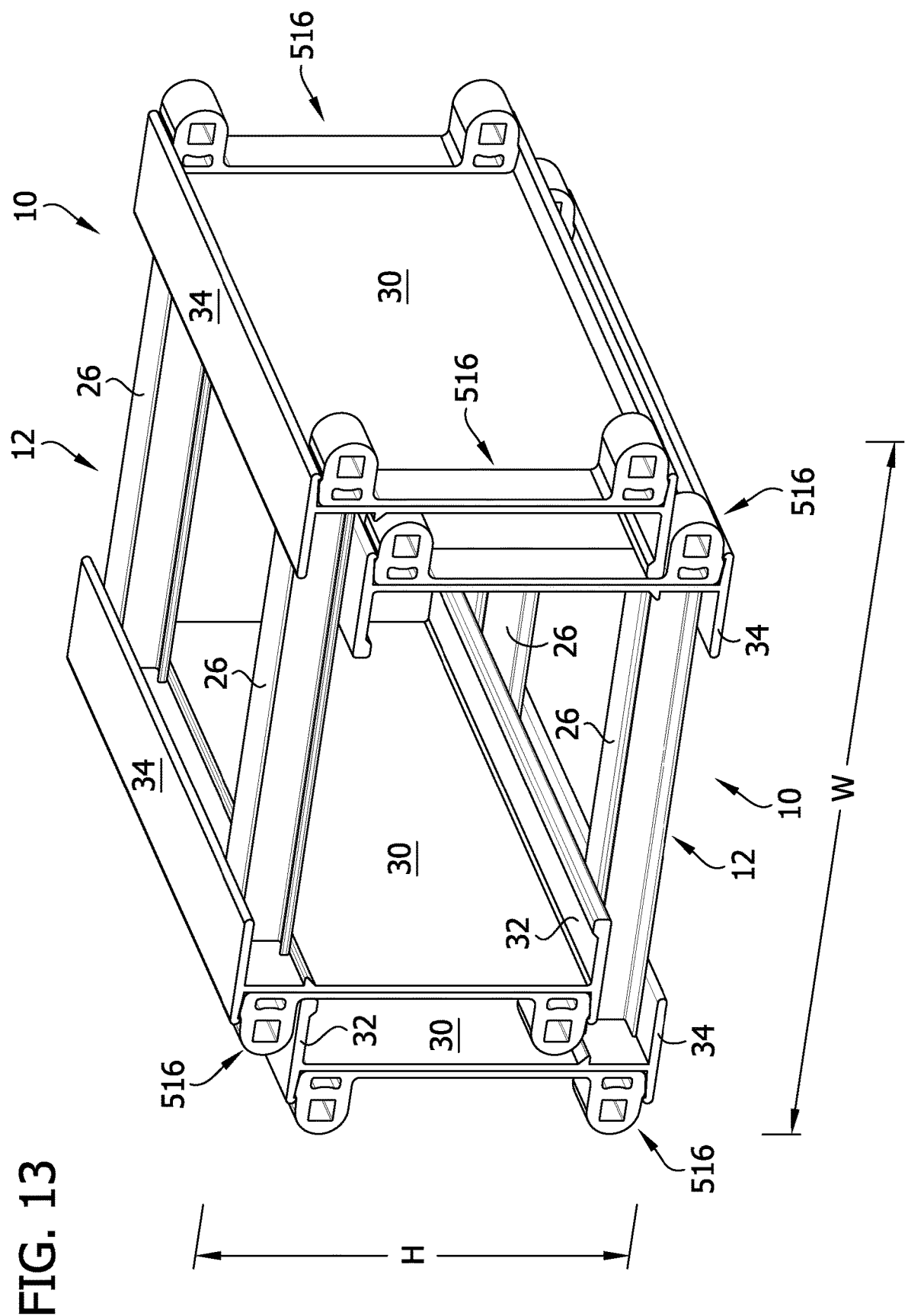
FIG. 13 is a perspective of two cable tray sections, with the splice members of FIG. 11, nested together.

Referring to FIGS. 11-13, another embodiment of a splice member for splicing together adjacent cable tray sections 12 is generally indicated at reference numeral 516. The splice member 16 includes a body, generally indicated at 540, configured to be attached to one of the rails 24 of the cable tray section 12. The body includes an upper fastener housing 542 and a lower fastener housing 544. The upper and lower fastener housings 542, 544 are generally mirror images of each other about an imaginary horizontal line. An intermediate wall 546 extends between and interconnects the upper and lower fastener housings 542, 544.

The body 540 (broadly, at least a portion of the body) is sized and shaped to correspond to the cross-sectional shape of the rail 24 of the cable tray section 12. The upper fastener housing 542, lower fastener housing 544 and intermediate wall 546 are configured to correspond generally to the size and shape of the rail 24, specifically, the outboard portion of the rail. The intermediate wall 546 is configured to engage the vertical web 30 of the rail 24 and, in one or more embodiments, lays flat against the vertical web when the splice member 516 is attached to the cable tray section 12 (FIG. 13). The upper and lower fastener housings 542, 544 are configured to engage the upper and lower horizontal flanges 32, 34, respectively. Specifically, the upper surface of the upper housing 542 is configured to engage the upper flange 32 of the rail 24 and the lower surface of the lower housing 544 is configured to engage the lower flange 34 of the rail. In this manner, the splice member 516 is in a close fitting relationship with the rail 24 when the splice member is attached to the rail. In the illustrated embodiment, the upper and lower fastener housings 542, 544 each include a notch or recess 554, defined by the upper surface of the upper fastener housing and the lower surface of the lower fastener housing, respectively, configured to receive the lip 33 or other projection from the upper and lower horizontal flanges 32, 34 to facilitate the coupling of the splice member 16 to the rail 24 of the cable tray section 12. In other embodiments, the body 340 may have other shapes and sizes to conform to rails 24 of other shapes and sizes. In addition, the upper fastener housing 542 includes a generally planar lower surface that extends outward from the intermediate wall 546 and is generally perpendicular to the intermediate wall. Similarly, the lower fastener housing 44 includes a generally planar upper surface that extends outward from the intermediate wall 546 and is generally perpendicular to the intermediate wall. Broadly, the upper and lower fastener housings 542, 544 extend outward from and are generally perpendicular to the intermediate wall 546.

Each fastener housing 542, 544 includes a fastener opening 558 (broadly, the splice member 515 includes one or more fastener openings). In the illustrated embodiment, the fastener openings 58 are defined by the upper and lower fastener housings 542, 544. The two fastener openings 558 are vertically spaced apart. In other embodiments, the splice member 516 may include more or less fastener openings 558. Each opening 558 has (e.g., defines) an axis. The axis of each opening 558 extends along to the rail 24 when the splice member 516 is attached to the rail. When secured to the rail 24, the axis of each opening 558 is generally parallel to the rail 24 and the cable loading plane. The fastener openings 558 are configured to receive a fastener 90 to attach adjacent splice members 516 and, thereby, cable tray sections 12 together, as described in more detail below. In the illustrated embodiment, the fastener openings 558 have a rectangular or square-shaped cross section. In other embodiments, the fastener openings 558 may have other cross-sectional shapes. The fastener openings 58 are spaced apart from (e.g., laterally offset from) the intermediate wall 546 in order to provide clearance for a tool to engage either the fastener 90 or nut 94 when the splice member 516 is attached to the cable tray section 12.

The splice member 516 includes front and rear surfaces 548, 550. The front and rear surfaces 548, 550 extend over the upper fastener housing 542, lower fastener housing 554 and intermediate wall 546. As shown in FIG. 13, when the splice member 516 is attached to the rail 24, the front or rear surface is generally aligned with the longitudinal end of the rail 24. It is appreciated that the splice member 516 attached to one rail 24 is rotate approximately 180 degrees (e.g., flipped over, turned around) from the splice member attached to the other rail of the cable tray section 12. Each opening 558 has open front and rear ends on the front and rear surfaces 548, 550, respectively, of the splice member 516 to allow the fastener 90 to extend through the opening. The front and rear surfaces 548, 550 are engaged by either the head 94 of the fastener 90 or the nut 92 when the fastener and nut are used to secure adjacent cable tray sections 12 together via the splice members 516. Preferably, the entire head 94 of the fastener 90 and the nut 92 engage either the front or rear surfaces 548, 550 so that the forces applied by the head of the fastener and nut are spread out over a greater surface area and so that the front and rear surfaces generally cover the edges of the head of the fastener and the nut, similar to the seat 61 of splice member 16 described above.

In one embodiment, the body 540 of the splice member 516 may also include an accessory attachment portion, as described above, to connect the splice member to a cable tray accessory, such as a bonding jumper. Moreover, the splice member 516 may provide an attachment location for various accessories used with a cable tray assembly 10 such as a lifting accessory used during installation, hold-down clamps, suspension hangers, seismic bracing, expansion rails, etc. It is also understood, the splice member 516 may further stiffen and strengthen the section of the rail 24 the splice member is attached to in order to better withstand the forces applied by these various accessories used with the cable tray assembly 10.

The body 540 of the splice member 516 may be integrally formed as a single, one-piece component. In one embodiment, the splice member 16 is formed from extruded aluminum, although the splice member may be formed from other metals or alloys or other materials (e.g., plastic) and/or formed by other methods with departing from the scope of the present disclosure. In one embodiment, the splice member 516 is integrally formed with the cable tray section 12 (e.g., rail 24) to form a single, one-piece component. In another embodiment, the splice member 516 is a separate component from the cable tray section 12 and is mechanically and/or chemically joined to the cable tray section—either in the field or at a manufacturing facility. For example, as mentioned above, the upper and lower fastener housings 542, 554 each include recesses 554 that receive portions (e.g., the lip 33) of the rail 24 to couple the splice member to the cable tray section 12 (FIG. 13) via a snap-fit connection, as described above in relation to splice member 16. In another embodiment, the splice member 516 may include adhesive to bond the splice member to the vertical web 30 of the rail 24. For example, the adhesive may be disposed on the portions of the upper fastener housing 542, lower fastener housing 544 and/or intermediate wall 546 that engage the rail 24 to bond the splice member 516 to the rail. In another embodiment, the intermediate wall 546 may define fastener openings that are alignable with corresponding fastener openings (not shown) in the rail 24 and through which fasteners (not shown) are received to connect the splice member 516 to the cable tray section 12. Other manners of attaching the splice member 516 to the cable tray section 12 are within the scope of the present disclosure.

Splice member 516 is similar to splice member 16. Thus, it is understood that the teachings set forth above regarding the use and operation of splice member 16 with the cable tray section 12 apply equally to splice member 516. For example, as previously mentioned, the splice member 516 may be mechanically and/or chemically joined to the cable tray section 12 such as by a snap-fit connection or with adhesive, respectfully. Moreover, the method of using splice member 516 to join or splice adjacent cable tray sections 12 together is generally the same as using splice member 16.

Referring to FIG. 13, splice members 516 minimize the width W (e.g., lateral space) the cable tray assemblies 10 (e.g., a cable tray section 12 with one or more splice members 516 thereon) occupy when the cable tray assemblies are being transported. Generally, in order to minimize the space cable tray assemblies 10 occupy when being transported, and therefore maximize the number of cable tray assemblies that can be transported at one time, the cable tray assemblies are nested together, as shown in FIG. 13. To nest two cable tray assemblies 10 together, one cable tray assembly is flipped over (e.g., inverted) and placed over the other cable tray assembly. When nested, each cable tray assembly 10 has one rail 24 that engages the rungs 26 of the other cable tray assembly (e.g., each cable tray assembly includes one rail that extends into the cable receiving space of the other cable tray assembly). This minimizes the overall height H of the nested cable tray assemblies. However, as shown in FIG. 13, the top and bottom cable tray assemblies 10 are laterally offset from one another when nested together because the overlap of the rails 24 (e.g., the rails of the cable tray assemblies are inboard and outboard of each other). Accordingly, the width W of the nested cable tray assemblies 10 occupy is determined by how close the rails 24 of each cable tray assembly can get to one another. Because the intermediate wall 546 of the splice member 516 is relatively thin, the rails 24 of the nest cable tray assemblies 10 can get close together (e.g., are only separated by the width of the intermediate wall), as shown in FIG. 13, minimizing the width W the nested assembly occupies. This allows more cable tray assemblies 10 to be shipped at any one time. Moreover, preferably, the upper and lower fastener housings 542, 554 have a height that is less than the height of the rungs 26 and a width less than a distance between the vertical web 30 and the inboard edge of the top flange 32 so that the splice member 516 does not unnecessarily increase the height H or width W of the nested cable tray assemblies 10. As shown in FIG. 13, upper and lower fastener housings 542, 554 having these dimensions will not engage the other cable tray assembly 10 in a nested arrangement, and therefore not increase one or both of the height H and width W of the nested cable tray assemblies.

Figure 14:
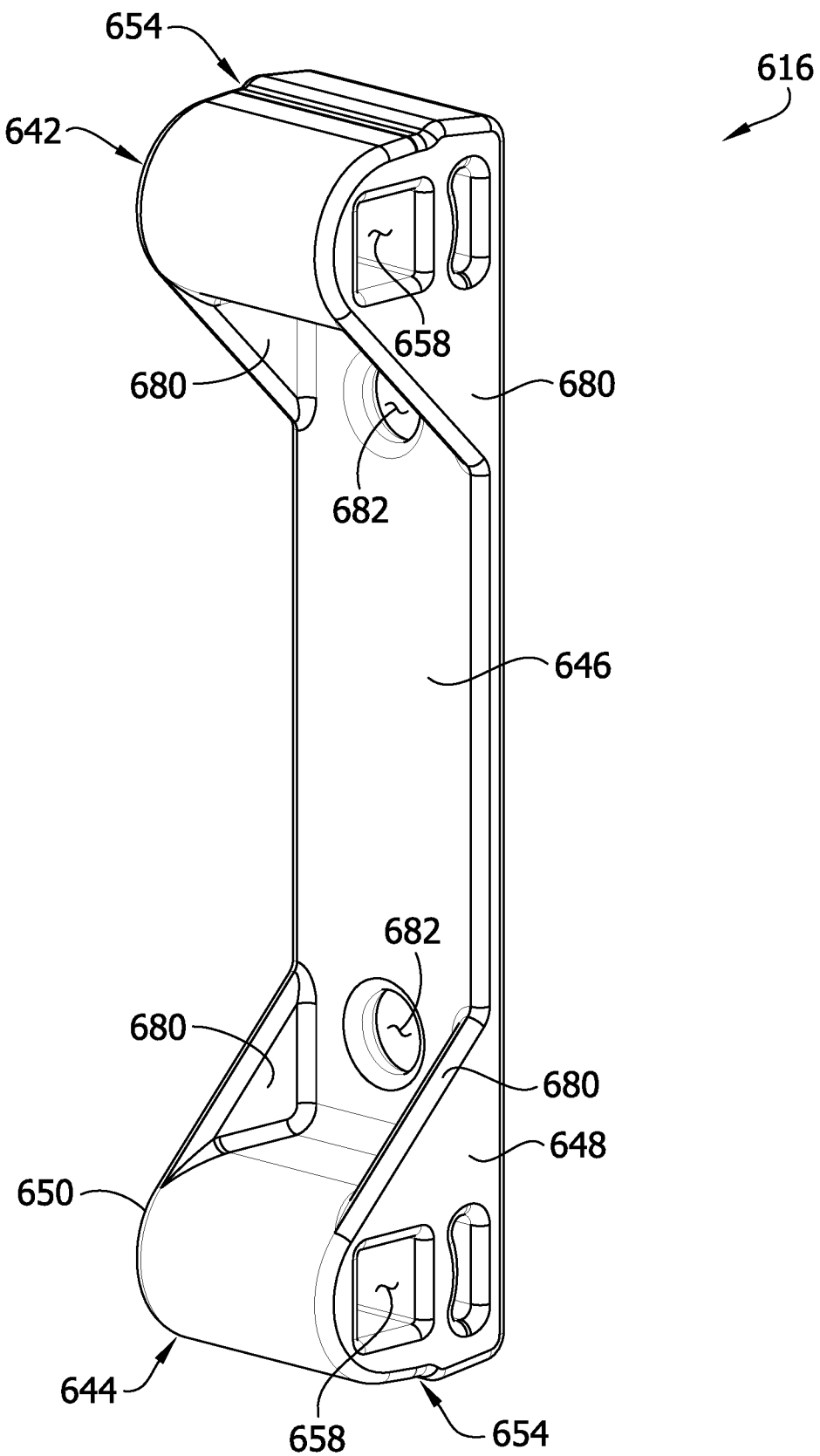
FIG. 14 is a perspective of another embodiment of a splice member of the present disclosure.

Referring to FIG. 14, another embodiment of a splice member for splicing together adjacent cable tray sections 12 is generally indicated at reference numeral 616. Splice member 616 is similar to splice member 516 and, thus, fore ease of comprehension, where similar or analogous parts are used, reference numerals "100" units higher are employed. Splice member 616 is generally the same as splice member 516 except that splice member 616 is made from plastic (e.g., molded plastic) and includes two reinforcing flanges 680 extending from the intermediate wall 646 to each of the upper and lower fastener housings 642, 644. The reinforcing flanges 680 strengthen and stiffen the connection between the fastener housings 642, 644 and the intermediate wall 646. Front upper and lower reinforcing flanges 680 define portions of the front face 648 and rear upper and lower reinforcing flanges 680 define portions of the rear face 650.

In addition, the intermediate wall 646 includes (e.g., defines) two fastener openings 682 that are alignable with corresponding fastener openings (not shown) in the rail 24 and through which fasteners (not shown) are received to connect the splice member 616 to the cable tray section 12. Otherwise, splice member 616 is generally the same as splice member 516 and operates in a same/similar way.

It is apparent that any of the elements, features, and/or teachings set forth in each embodiment(s) disclosed herein are not limited to the specific embodiment(s) the elements, features and/or teachings are described in. Accordingly, it is understood that any of the elements, features and/or teachings described in one embodiment may be applied to one or more of the other embodiments disclosed herein. For example, it is understood that any and all teachings regarding the accessory attachment portion 64 may be applied to any of the other embodiment disclosed herein.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A splice member for a splicing together cable tray sections, the splice member comprising:
   a body configured to be attached to a rail of the cable tray section, wherein the body defines at least one opening configured to receive a fastener to connect the splice member to another splice member, wherein the at least one opening has an axis extending along the rail when the body is attached to the rail, wherein the body is sized and shaped to correspond to the cross-sectional shape of a rail of a cable tray so that a first perimeter wall of the splice member engages a vertical web of the rail, and a second perimeter wall and a third perimeter wall of the splice member engage an upper flange and a lower flange of the cable tray, respectively,
   wherein the body includes a perimeter wall, at least a portion of the perimeter wall sized and shaped to correspond to the cross-sectional shape of the rail of the cable tray section such that the body is in a close fitting relationship with the rail when the body is attached to the rail,
   wherein the body is configured to be mechanically secured to the rail of the cable tray section,
   wherein the body is configured to form a snap-fit connection with the rail,
   wherein the perimeter wall defines at least one recess configured to receive a lip of the rail to form the snap-fit connection with the rail.

2. The splice member set forth in claim 1, wherein the at least one opening is spaced apart from and disposed interiorly of the perimeter wall.

3. The splice member set forth in claim 2, wherein the at least one opening includes at least two openings.

4. The splice member set forth in claim 1, further comprising an adhesive disposed on at least a portion of a perimeter wall and configured to engage to the rail to bond the body to the rail.

5. The splice member set forth in claim 1, wherein the at least one opening is configured to receive is a carriage bolt, the at least one opening having a square cross-sectional shape configured to receive a square head of the carriage bolt to prevent the carriage bolt from rotating relative to the body when the carriage bolt is inserted into the at least one opening.

6. The splice member set forth in claim 1, wherein the at least one opening is at least partially defined by one or more interior walls disposed within the perimeter wall.

7. The splice member set forth in claim 1, wherein the body includes an accessory attachment portion configured to connect to a cable tray accessory.

8. A cable tray section comprising:
   first and second side rails, each side rail having opposite longitudinal ends and a length extending between the opposite longitudinal ends;
   a splice member secured to one of the first and second rails adjacent one of the longitudinal ends, wherein the splice member includes at least one opening configured to receive a fastener to connect the splice member to a second splice member of a second cable tray section in order to join the cable tray section with said second cable tray section, wherein the at least one opening has an axis extending along the length of said at least one of the first and second rails, wherein the splice member is sized and shaped to correspond to the cross-sectional shape of a rail of a cable tray so that a first perimeter wall of the splice member engages a vertical web of the rail, and a second perimeter wall and a third perimeter wall of the splice member engage an upper flange and a lower flange of the cable tray, respectively,
   wherein the splice member is a first splice member, the cable tray section further comprising a second splice member secured to said other one of the first and second rails adjacent one of the longitudinal ends, wherein the second splice member is identical to the first splice member.

9. The cable tray section of claim 8, wherein the splice member includes a perimeter wall, at least a portion of the perimeter wall sized and shaped to correspond to the cross-sectional shape of the first and second rails of the cable tray section such that the splice member is in a close fitting relationship with said first or second rail the splice member is secured to.

10. The cable tray section of claim 8, wherein the at least one opening includes at least two openings.

11. The cable tray section of claim 8, wherein the splice member is mechanically secured to said first or second rail of the cable tray section.

12. The cable tray section of claim 11, wherein the splice member forms a snap-fit connection with said first or second rail.

13. The cable tray section of claim 8, wherein the fastener the at least one opening is configured to receive is a carriage bolt, the at least one opening having a square cross-sectional shape configured to receive a square head of the carriage bolt to prevent the carriage bolt from rotating relative to the body when the carriage bolt is inserted into the at least one opening.

14. The cable tray section of claim 8, wherein a front side of the splice member is aligned with said one longitudinal end of the said first or second rail.

15. The cable tray section of claim 8, in combination with said second cable tray section having said second splice member, wherein said second splice member is identical to the splice member, the splice member and second splice member configured to receive the fastener to secure and align the cable tray section and second cable tray section together.

16. A splice member for a splicing together cable tray sections, the splice member comprising:
  a body configured to be attached to a rail of the cable tray section, wherein the body defines at least one opening configured to receive a fastener to connect the splice member to another splice member, wherein the at least one opening has an axis extending along the rail when the body is attached to the rail, wherein the body is sized and shaped to correspond to the cross-sectional shape of a rail of a cable tray so that a first perimeter wall of the splice member engages a vertical web of the rail, and a second perimeter wall and a third perimeter wall of the splice member engage an upper flange and a lower flange of the cable tray, respectively,
 wherein the at least one opening is configured to receive is a carriage bolt, the at least one opening having a square cross-sectional shape configured to receive a square head of the carriage bolt to prevent the carriage bolt from rotating relative to the body when the carriage bolt is inserted into the at least one opening.

\* \* \* \* \*